United States Patent
Fang et al.

(10) Patent No.: US 11,238,423 B2
(45) Date of Patent: Feb. 1, 2022

(54) METHOD AND SYSTEM FOR DEVICE MICROPAYMENT AGGREGATION BASED ON TANGLE NETWORK

(71) Applicant: MASTERCARD ASIA/PACIFIC PTE. LTD., Singapore (SG)

(72) Inventors: Hui Fang, Singapore (SG); Bensam Joyson, Singapore (SG); Donghao Huang, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 310 days.

(21) Appl. No.: 16/278,364

(22) Filed: Feb. 18, 2019

(65) Prior Publication Data

US 2020/0265395 A1    Aug. 20, 2020

(51) Int. Cl.
*G06Q 20/14*    (2012.01)
*H04L 9/06*    (2006.01)
(Continued)

(52) U.S. Cl.
CPC .......... *G06Q 20/145* (2013.01); *G06Q 20/29* (2013.01); *G06Q 20/3821* (2013.01); *H04L 9/0637* (2013.01)

(58) Field of Classification Search
CPC .. G06Q 20/145; G06Q 20/29; G06Q 20/3831; H04L 9/0637
(Continued)

(56) References Cited

U.S. PATENT DOCUMENTS

2004/0225732 A1    11/2004    Coons et al.
2017/0257223 A1*    9/2017    Persson ............... H04L 12/1496
(Continued)

FOREIGN PATENT DOCUMENTS

JP    2017-102704 A    6/2017
KR    10-2018-0069470 A    6/2018
(Continued)

OTHER PUBLICATIONS

"IoT powered by Blockchain: How Blockchains facilitate the application of digital twins in IoT." Deloitte. Issue: May 2018. (Year: 2018).*

(Continued)

*Primary Examiner* — Sara C Hamilton
(74) *Attorney, Agent, or Firm* — Buchanan Ingersoll & Rooney PC

(57) ABSTRACT

A method for billing device usage through a data storage system and aggregation includes: receiving, in a device controller, user credentials for one of a plurality of users; detecting, by the device controller, usage parameters of a hardware device; submitting, by the device controller, a new usage transaction for usage of the hardware device to a data storage system including the user credentials and a usage fee based on the usage parameters; receiving, by an aggregator node, a plurality of usage transactions from the data storage system including the new usage transaction where each usage transaction includes user data and a fee amount; generating, by the aggregator node, an aggregated bill for each of the users including based on the fee amount included in each usage transaction associated with the respective user; and transmitting, by the aggregator node, each aggregated bill to a computing device associated with the respective user.

14 Claims, 5 Drawing Sheets

(51) Int. Cl.
*G06Q 20/38* (2012.01)
*G06Q 20/22* (2012.01)

(58) Field of Classification Search
USPC .......................................................... 705/40
See application file for complete search history.

(56) References Cited

U.S. PATENT DOCUMENTS

| | | | | |
|---|---|---|---|---|
| 2018/0276626 | A1* | 9/2018 | Laiben | G06Q 20/02 |
| 2018/0330348 | A1* | 11/2018 | Uhr | H04L 9/0637 |
| 2018/0330349 | A1* | 11/2018 | Uhr | G06Q 20/3825 |
| 2018/0331929 | A1* | 11/2018 | Gandhi | H04W 24/08 |
| 2019/0026716 | A1* | 1/2019 | Anbukkarasu | G06Q 20/389 |
| 2019/0075166 | A1* | 3/2019 | Gandhi | H04L 41/0853 |
| 2019/0172298 | A1* | 6/2019 | Just | G07F 17/0042 |
| 2020/0244472 | A1* | 7/2020 | Dinkelaker | H04L 47/783 |
| 2020/0412521 | A1* | 12/2020 | Shi | H04L 9/3236 |

FOREIGN PATENT DOCUMENTS

| | | | | |
|---|---|---|---|---|
| KR | 10-1933134 B1 | 12/2018 | | |
| WO | WO-2016128491 A1 * | 8/2016 | ............ | G06F 9/5011 |
| WO | 2019/021019 A1 | 1/2019 | | |

OTHER PUBLICATIONS

Notification of Transmittal of the International Search Report (Form PCT/ISA/220 and PCT/ISA/210) and the Written Opinion of the International Searching Authority (Form PCT/ISA/237) dated May 7, 2020, by the International Application Division Korean Intellectual Property Office in corresponding International Application No. PCT/SG2020/050047. (10 pages).

* cited by examiner

METHOD AND SYSTEM FOR DEVICE MICROPAYMENT AGGREGATION BASED ON TANGLE NETWORK

FIELD

The present disclosure relates to billing for device usage through a transparent data storage system, specifically the use of a transparent data storage system to aggregate micropayments for device usage for aggregated billing to a plurality of different users.

BACKGROUND

People often need to access to a variety of different hardware devices for any number of reasons. Often times, a user may need access to a hardware device that is too expensive for the user to purchase themselves, or the user may need intermittent access to a hardware device such that it is not worth it for the user to outright purchase the device. Traditionally, some entities have assisted users in these situations by providing limited access to a hardware device for a fee. For example, libraries have commonly provided access to copiers, printers, fax machines, scanners, and other hardware devices that may be expensive or inefficient for a user to own, typically for a small fee. For instance, a user may be charged ten cents per copy when using a copier at a facility where one is available.

In more recent times, maker spaces have been developed. Maker spaces are businesses that operate by making a large number of uncommon or expensive hardware devices available for use by its users, such as 3D printers, large format printers, laser cutters, soldering irons, etc. Often times, users will pay a membership fee or other flat rate for use of the maker space. However, this may be inefficient for both user and space operator, as some users may make significantly higher use of the available hardware than their payment rate, while other users may only have a need of one or two devices for a short period of time and yet still pay the full membership fee. Thus, it would be advantageous to have a pay-per-use system available for users.

However, such systems are often difficult to implement. Pay-per-use schemes that have been traditionally used, such as seen on copiers and printers in libraries and other public spaces, often use attached machines that accept physical currency to operate. Other systems utilize prepaid cards that are inserted into an attached machine, where the user pays as they go. However, this locks a user into prepayment, when they may be unsure as to the amount of usage they will need, and can also limit the payment options available to a user. Thus, there is a need for an alternative system for billing users for the use of shared hardware devices, such as in a maker space or other environment.

SUMMARY

The present disclosure provides a description of systems and methods for billing device usage through a transparent data storage system and aggregation. When a user wants to use a hardware device, they supply user credentials that are used to track the user that is using a device and the device that is being used. Usage parameters (e.g., time, amount, etc.) are captured and provided, with the user credentials, to a transparent data storage system, such as a Tangle or blockchain. At periodic intervals, the device usage by each user during the period is aggregate as read from the transparent data storage system. Each user is then billed out for their aggregated device usage. The result is a method and system where aggregation is combined with a transparent data storage system to bill users for the usage of shared hardware devices. The use of aggregation simplifies the process for users, and reduces fees for space operators when credit cards and other similar payment methods are used. In addition, the use of a transparent data storage system ensures that no user is taken advantage of, users have easy access to monitor their own device usage, and all bills are fully auditable by the user or any third party.

A method for billing device usage through a transparent data storage system and aggregation includes: receiving, by an input device of a device controller, user credentials associated with one of a plurality of users; detecting, by the device controller, one or more usage parameters of a hardware device interfaced with the device controller; submitting, by a transmitter of the device controller, a new usage transaction for usage of the hardware device to a transparent data storage system, wherein the new usage transaction includes at least the user credentials and a usage fee based on the detected one or more usage parameters; receiving, by a receiver of an aggregator node, a plurality of usage transactions from the transparent data storage system, wherein the plurality of usage transactions includes the new usage transaction and each of the plurality of usage transactions includes user data and a fee amount; generating, by the aggregator node, an aggregated bill for each of the plurality of users including at least a billing amount based on the fee amount included in each of the plurality of usage transactions where the user data is associated with the respective user; and transmitting, by a transmitter of the aggregator node, each generated aggregated bill to a computing device associated with the respective user.

A system for billing device usage through a transparent data storage system and aggregation includes: an input device of a device controller configured to receive user credentials associated with one of a plurality of users; the device controller configured to detect one or more usage parameters of a hardware device interfaced with the device controller; a transmitter of the device controller configured to transmit a new usage transaction for usage of the hardware device to a transparent data storage system, wherein the new usage transaction includes at least the user credentials and a usage fee based on the detected one or more usage parameters; a receiver of an aggregator node configured to receive a plurality of usage transactions from the transparent data storage system, wherein the plurality of usage transactions includes the new usage transaction and each of the plurality of usage transactions includes user data and a fee amount; the aggregator node configured to generate an aggregated bill for each of the plurality of users including at least a billing amount based on the fee amount included in each of the plurality of usage transactions where the user data is associated with the respective user; and a transmitter of the aggregator node configured to transmit each generated aggregated bill to a computing device associated with the respective user.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

Tangle—A directed acyclic graph (DAG) for storing transactions. Similar to blockchain, the Tangle is decentralized and distributed, with participants approving other transactions entered into the Tangle. When a new transaction joins the tangle, it chooses two previous transactions to approve. The chosen transactions can be selected randomly, or through any suitable criteria. Transactions are approved by reviewing each transaction leading up to the transaction through the Tangle back to the very first transaction, the genesis transaction. Additional information regarding the operation of a Tangle can be found in the whitepaper where the Tangle was first introduced, "The Tangle" by Serguei Popov available from iota.org.

System for Aggregated Billing of Hardware Device Usage

Figure 1:
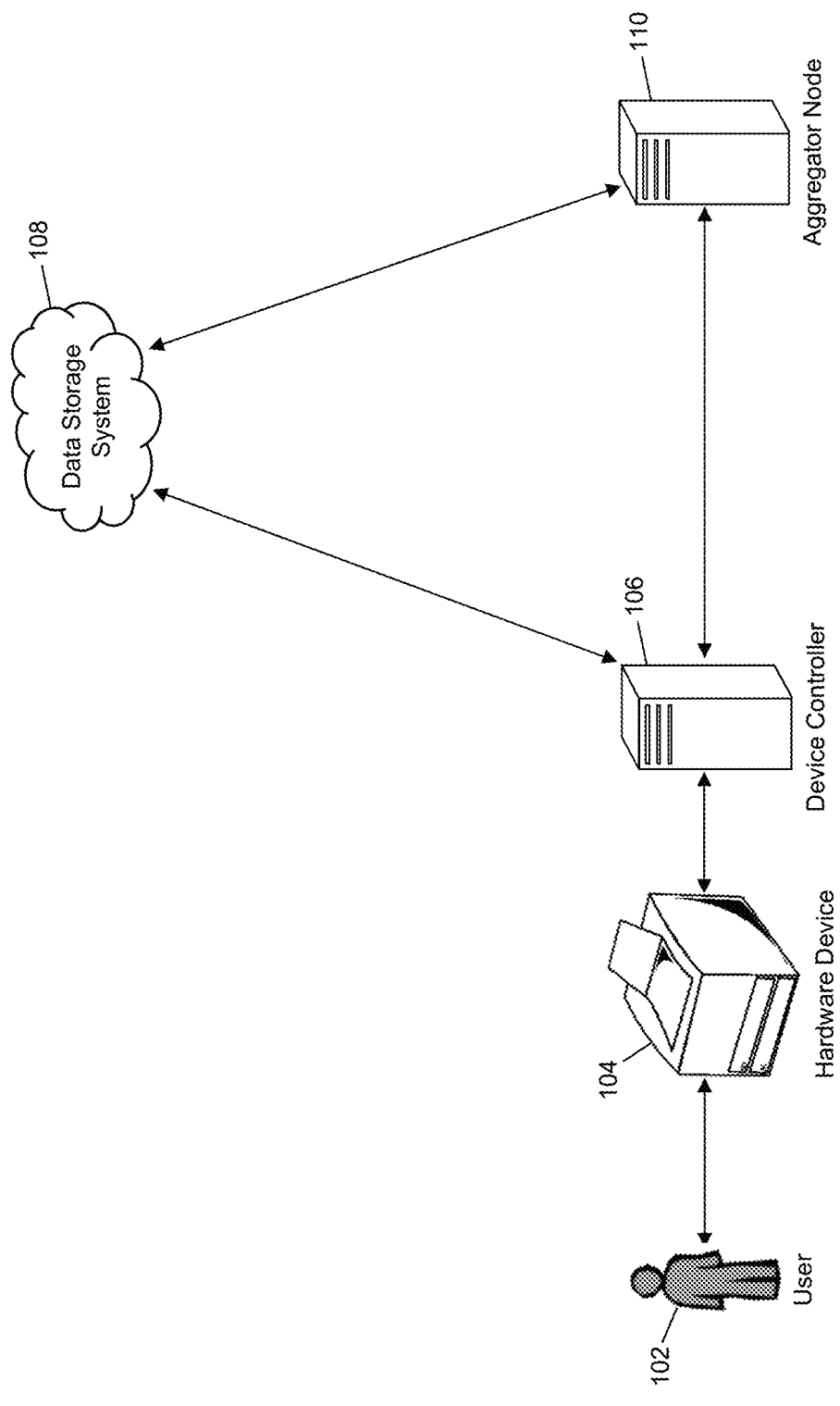
FIG. 1 is a block diagram illustrating a high level system architecture for billing device usage through a transparent data storage system in accordance with exemplary embodiments.

FIG. 1 illustrates a system 100 for the aggregated billing of the usage of hardware devices 104 by a plurality of different users 102 through the use of a transparent data storage system 108.

In the system 100, one or more hardware devices 104 may be available for use by a plurality of different users 102. A hardware device 104 may be any type of device that may be made available for which use and/or operation thereof may be billed. A hardware device 104 may be, for example, a copier, scanner, fax machine, printer, 3D printer, laser cutter, sewing machine, table saw, band saw, or any other suitable type of device. Each hardware device 104 may be interfaced with a device controller 106. The device controller 106 may be a computing system that is specially configured to interface with a hardware device 104 to collect user credentials from users 102 that want to use the interfaced hardware device 104 and to collect usage parameters of the interfaced hardware device 104. The device controller 106 may be a separate and distinct computing system from a hardware device 104 or may be built-in or otherwise combined with the hardware device 104. In some systems 100, some hardware devices 104 may have built in device controllers 106, while other hardware devices 104 may be connected to external device controllers 106 through any suitable means, such as a local area network, radio frequency, serial connection, universal serial bus, Ethernet, etc.

A device controller 106 may be configured to collect user credentials from a user 102 wanting to use the interfaced hardware device 104. User credentials can be submitted to a device controller 106 using any suitable method. In a first example, the device controller 106 may include an input device (e.g., keyboard, mouse, touch screen, microphone, etc.) where the user 102 manually inputs their user credentials. In a second example, the user 102 may use a mobile computing device, such as a smart phone, to electronically transmit the user credentials to a receiver of the device controller 106, such as through Bluetooth, radio frequency, near field communication, etc. In a third example, the user 102 may possess a physical card that has a magnetic stripe encoded with user credentials that is readable by the device controller 106. In a fourth example, the user 102 may possess a physical card that has a machine-readable code, such as a bar code or a quick response (QR) code displayed thereon that is encoded with their user credentials, that may be read by an optical imaging device of the device controller 106.

The user credentials may include at least identification data used to identify the user 102 with which the credentials are associated. The identification data may include, for example, a user identifier, which may be a value unique to the associated user 102, such as an identification number, telephone number, e-mail address, username, or other suitable value. User credentials may also include any other suitable data, such as information used for authentication (e.g., a password, biometric data, one-time password, etc.), name, device preferences, usage statistics, etc.

The device controller 106 may receive the user credentials from the user 102 and provide access to the hardware device 104 for the user 102. In embodiments where authentication may be used, the device controller 106 may first authenticate the user 102, such as to ensure that the user 102 is authorized access to the interfaced hardware device 104. For example, the hardware device 104 may be a device for which the user 102 has to have previously signed a release document to operate or have received training for, where the device controller 106 may authenticate the user 102 and identify if such conditions have been satisfied by the user 102. In some such embodiments, the authentication and/or identification of user satisfaction may be performed by an external computing system. For example, the device controller 106 may communicate with a server or other computing system, such as the data storage system 108, discussed in more detail below, for such information. For instance, the data storage system 108 may store all user information, and the system 100 may further include a specialized authentication server that authenticates the user 102, determines if they are permissioned to access the hardware device 104, and then returns the result of the determination to the device controller 106. The device controller 106 may accordingly enable or disable access to the hardware device 104 to the user 102.

If the user 102 is provided with access to the hardware device 104 following the providing of their user credentials to the device controller 106, the user 102 may then begin to use the hardware device 104. The device controller 106 may be configured to collect usage parameters for the user's use of the hardware device 104. Usage parameters may include data regarding the user's usage of the hardware device 104, which may vary based on the type of hardware device 104, billing scheme for the hardware device 104, or other suitable criteria. For example, the usage parameters for any hardware device 104 may include time of usage (e.g., where the user 102 must indicate when they are finished with the hardware device 104), volume of usage (e.g., number of copies made on a copy machine, amount of filament used in a 3D printer, etc.), etc.

Usage parameters for the use of a hardware device 104 by a user 102 may be submitted to a transparent data storage system 108 by the device controller 106. The data storage system 108 may be any type of data storage system that is made transparent such that usage information is accessible to users 102 and/or any interested party. In an exemplary embodiment, the data storage system 108 may be a blockchain or Tangle. Accordingly, the data storage system 108 may be comprised of a plurality of nodes that are configured to collect and approve transactions. In the context of the system 100, a transaction may be a transaction for usage of a hardware device 104 by a user 102. For example, when the user 102 uses a hardware device 104, the information submitted by the interfaced device controller 106 to the data storage system 108 may be added to the data storage as a new transaction.

The node in the data storage system 108 may receive the usage information from the device controller 106 and generate a new usage transaction that is to be confirmed by one or more other nodes in the data storage system 108 and stored therein. The new usage transaction may include at least user data and a fee amount. The user data may include the user identifier for the user 102 and/or any other user credentials that may be necessary for use in aggregating usage transactions for a user 102 and billing of the user 102 for payment. If the data storage system 108 is a blockchain, user data may include, for instance, a public key or blockchain address for the user 102. The fee amount may be the fee to be charged to the user 102 for usage of the hardware device 104. The fee amount may be based on the usage parameters captured by the device controller 106 and may be calculated by the device controller 106, node in the data storage system 108, or other suitable computing system in the system 100. In an exemplary embodiment, each hardware device 104 may have a rate schedule associated therewith, where the fee amount may be calculate using the applicable rate schedule and the usage parameters captured for use of the hardware device 104. For example, a copy machine may have a set cost per copy, a 3D printer may have a set cost per specified amount of filament, a laser cutter may have a set cost per interval of time used, etc.

The data storage system 108 may generate the usage transaction which may be confirmed by other nodes in the data storage system 108 and stored in the data storage using suitable methods and systems based on the type of data storage utilized. For instance, if the data storage system 108 is a blockchain, each usage transaction may be included in a new block that is generated, verified, and added to the blockchain. In an exemplary embodiment, the data storage may be transparent such that the user 102 may be able to view the data storage and see the new usage transaction regarding their use of the hardware device 104 and any other device usage made in the system 100.

The system 100 may also include an aggregator node 110. The aggregator node 110 may be a computing system that is specially configured to aggregate usage transactions for each user 102 from the data storage system 108 and to generate a bill based thereon that is distributed to each user 102 in the system 100 for payment. In some embodiments, the aggregator node 110 may be a node in the data storage system 108. In other embodiments, the aggregator node 110 may be separate from the data storage system 108, but may be configured to communicate therewith using any suitable communication method and system. In some cases, the aggregator node may perform aggregation and billing at a predetermined interval, such as daily, weekly, monthly, etc. In other cases, the aggregation may be based on the usage transactions for each user 102. For instance, the aggregator node 110 may aggregate usage transactions for each user 102 as they are added to the data storage system 108 and may monitor the total fee amount for the aggregated transactions, where the user 102 may be billed once the aggregated fee amount reaches a predetermined value. For example, a user 102 may be billed any time their total usage goes above $100 in fees, where the predetermined value may be set by a site operator, by the user 102 (e.g., per an agreement with the site operator), or other applicable entity. In some cases, each user 102 may have a different predetermined value or billing interval, such as based on their preferences, when they create their membership, etc.

Once the aggregator node 110 has generated an aggregated bill for a user 102, the bill may be transmitted to the user 102. In one embodiment, the bill may be transmitted to a computing device associated with the user 102, such as a desktop computer, laptop computer, notebook computer, tablet computer, cellular phone, smart phone, etc. For instance, the user 102 may receive the bill via e-mail, a short messaging service message, an web site, an application program, etc. In some cases, the bill may be transmitted to a third party service that may bill the user 102 based thereon, such as through PayPal® or other service. In some embodiments, the user 102 may be billed through the data storage system 108, such as for payment via a cryptocurrency operated through blockchain or Tangle.

In some embodiments, the user 102 may register with the aggregator node 110 and/or data storage system 108 when obtaining their user credentials. As part of the registration process, the user 102 may provide communication data that may be used in transmitting a bill to the user 102. For instance, the communication data may be data used to transmit a data message to a computing device accessible by the user 102 for transmission of the bill thereto, such as an e-mail address, telephone number, internet protocol address, media access control address, etc. In some cases, user registration may include the user 102 providing preferences regarding method of billing, frequency of billing, method of distribution of the bill, etc.

The methods and systems discussed herein provide for the aggregated billing of users 102 for usage of hardware devices 104 using a transparent data storage system 108. The aggregation of billing may ensure that micropayments are not required to be made by a user 102, reducing the payment of fees that may be necessary by users 102 and/or site operators, and increasing the convenience provided to users 102. The use of billing following usage instead of prepaid billing methods, as well as the distribution of bills to users 102, enables users 102 to pay using their desired method, further increasing user convenience 102. In addition, the use of a transparent data storage system 108, such as a blockchain or Tangle, provides for full auditability of device usage and billing, enabling a user 102 or site operator to check for billing inaccuracies or any attempted fraud. Thus, the system 100 provides for a number of technical advantages over traditional systems, solving the problems common in these systems via the implementation discussed herein and use of a transparent data storage system and aggregation.

Computing System

Figure 2:
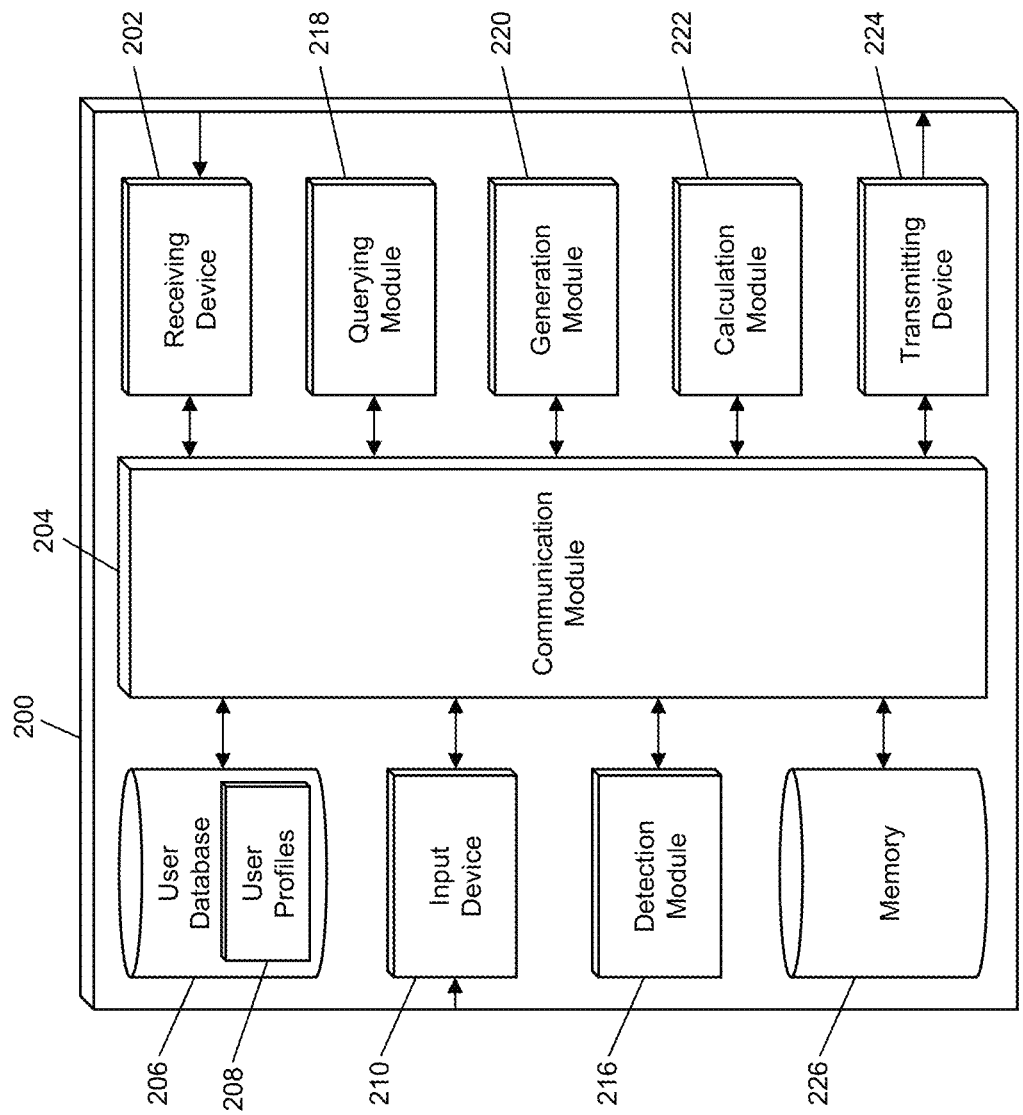
FIG. 2 is a block diagram illustrating a computing system of the system of FIG. 1 for billing device usage in accordance with exemplary embodiments.

FIG. 2 illustrates an embodiment of a computing system 200 in the system 100. It will be apparent to persons having skill in the relevant art that the embodiment of the computing system 200 illustrated in FIG. 2 is provided as illustration only and may not be exhaustive to all possible configurations of the computing system 200 suitable for performing the functions as discussed herein. For example, the computer system 500 illustrated in FIG. 5 and discussed in more detail below may be a suitable configuration of the computing system 200. The device controller 106, a node in the data storage system 108, and/or the aggregator node 110 may be implemented as the computing system 200, which may be specially configured to perform the functions of the respective component as discussed herein.

The computing system 200 may include a receiving device 202. The receiving device 202 may be configured to receive data over one or more networks via one or more network protocols. In some instances, the receiving device 202 may be configured to receive data from hardware devices 104, device controllers 106, data storage system nodes, aggregator nodes 110, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by hardware devices 104, which may be superimposed or otherwise encoded with usage information. The receiving device 202 may be configured to receive data signals electronically transmitted by device controllers 106, which may be superimposed or otherwise encoded with usage parameters, user credentials, fee amounts, rate schedules, and any other suitable data. The receiving device 202 may also be configured to receive data signals electronically transmitted by nodes in the data storage system 108 that may be superimposed or otherwise encoded with new usage transactions, calculated fee amounts, user data, and any other suitable data. The receiving device 202 may also be configured to receive data signals electronically transmitted by aggregator nodes 110, which may be superimposed or otherwise encoded with generated bills, aggregated fee amounts, requests for usage transactions, user data, and any other suitable data.

The computing system 200 may also include a communication module 204. The communication module 204 may be configured to transmit data between modules, engines, databases, memories, and other components of the computing system 200 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing system 200 and external components of the computing system 200, such as externally connected databases, display devices, input devices, etc. The computing system 200 may also include a processing device. The processing device may be configured to perform the functions of the computing system 200 discussed herein as will be apparent to persons having skill in the relevant art. In some embodiments, the processing device may include and/or be comprised of a plurality of engines and/or modules specially configured to perform one or more functions of the processing device, such as a detection module 216, querying module 218, generation module 220, calculation module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing system 200 may include a user database 206. The user database 206 may be configured to store a plurality of user profiles 208 using a suitable data storage format and schema. The user database 206 may be a relational database that utilizes structured query language for the storage, identification, modifying, updating, accessing, etc. of structured data sets stored therein. Each user profile 208 may be a structured data set configured to store data related to a user 102, which may include, for instance, user credentials, authentication data, communication data, an aggregated fee amount, user usage preferences, user billing preferences, etc.

The computing system 200 may also include or be otherwise interfaced with one or more input devices 210. The input devices 210 may be internal to the computing system 200 or external to the computing system 200 and connected thereto via one or more connections (e.g., wired or wireless)

for the transmission of data to and/or from. The input devices 210 may be configured to receive input from a user (e.g., the user 102) of the computing system 200, which may be provided to another module or engine of the computing system 200 (e.g., via the communication module 204) for processing accordingly. Input devices 210 may include any type of input device suitable for receiving input for the performing of the functions discussed herein, such as a keyboard, mouse, click wheel, scroll wheel, microphone, touch screen, track pad, camera, optical imager, etc. The input device 210 may be configured to, for example, receive user credentials from a user 102 as supplied manually or through an intermediate device (e.g., a computing device, physical card, etc.) or other suitable method.

The computing system 200 may include a detection module 216. The detection module 216 may be configured to detect data for the computing system 200 for use in performing the functions discussed herein. The detection module 216 may be configured to perform detections using any suitable method, such as by transmitting prompts or information requests, monitoring for received signals, etc. The detection module 216 may receive data, perform detections based thereon, and output results of detections to other modules or engines of the computing system 200. The detection module 216 may, for example, be configured to detect usage parameters regarding usage of a hardware device 104 for use in determining fee amounts for device usage.

The computing system 200 may include a querying module 218. The querying module 218 may be configured to execute queries on databases to identify information. The querying module 218 may receive one or more data values or query strings, and may execute a query string based thereon on an indicated database, such as the user database 206, to identify information stored therein. The querying module 218 may then output the identified information to an appropriate engine or module of the computing system 200 as necessary. The querying module 218 may, for example, execute a query on the user database 206 to identify a user profile 208 using received user credentials to identify user preferences, communication data, etc.

The computing system 200 may also include a generation module 220. The generation module 220 may be configured to generate data for use by the computing system 200 in performing the functions discussed herein. The generation module 220 may receive instructions as input, may generate data based on the instructions, and may output the generated data to one or more modules of the computing system 200. For example, the generation module 220 may be configured to generate notifications and other data messages for transmission to user computing devices, device controllers 106, aggregator nodes 110, etc. The generation module 220 may also be configured to generate usage transactions based on hardware device 104 usage by a user 102, bills based on aggregated usage transactions, etc.

The computing system 200 may also include a calculation module 222. The calculation module 222 may be configured to perform calculations for the computing system 200 for use in performing the functions discussed herein. The calculation module 222 may instructions for a calculation to be made as input, may perform the calculation, and may output a result of the calculation to another module or engine of the computing system 200. The calculation module 222 may, for example, be configured to calculate a usage fee amount for usage of a hardware device 104 based on usage parameters and a rate schedule for the hardware device 104. The calculation module 222 may also be configured to calculate billing amounts based on the fee amount included in aggregated usage transactions for a user 102.

The computing system 200 may also include a transmitting device 224. The transmitting device 224 may be configured to transmit data over one or more networks via one or more network protocols. In some instances, the transmitting device 224 may be configured to transmit data to computing devices, hardware devices 104, device controllers 106, nodes in a data storage system 108, aggregator nodes 110, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to hardware devices 104 that are superimposed or otherwise encoded with user preferences, requests for usage parameters, etc. The transmitting device 224 may also be configured to electronically transmit data signals to device controllers 106 that may be superimposed or otherwise encoded with user credentials, rate schedules, usage parameters, etc. The transmitting device 224 may be further configured to electronically transmit data signals to nodes in a data storage system 108 that may be superimposed or otherwise encoded with user data, fee amounts, usage parameters, requests for usage transactions, etc. The transmitting device 224 may also be configured to electronically transmit data signals to aggregate nodes 110, which may be superimposed or otherwise encoded with bill requests, usage transactions, user communication data, etc.

The computing system 200 may also include a memory 226. The memory 226 may be configured to store data for use by the computing system 200 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the computing system 200 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, blockchain data, Tangle data, hashing algorithms for generating blocks, credentials for validation, usage rule templates, rate schedules, communication data for data storage system 108 nodes, communication data for computing devices, usage parameter information, fee aggregation algorithms and criteria, etc.

Process for Billing of Hardware Device Usage

Figure 3:
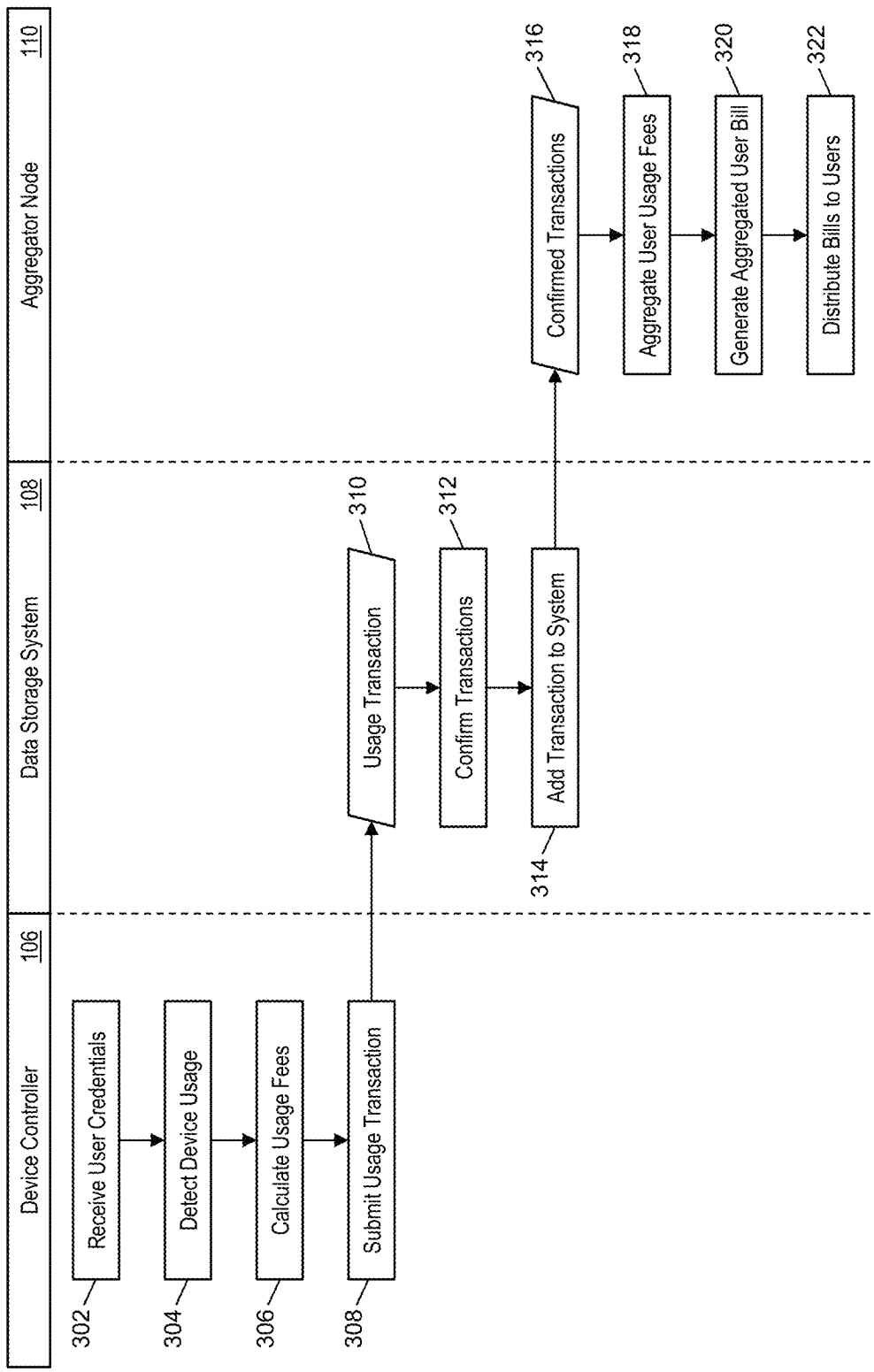
FIG. 3 is a flow diagram illustrating a process for billing device usage through a transparent data storage system in the system of FIG. 1 in accordance with exemplary embodiments.

FIG. 3 illustrates an example process for the billing of the usage of hardware devices 104 by users 102 in the system 100 through the use of a transparent data storage system 108 and aggregation by the aggregator node 110.

In step 302, the device controller 106 may receive (e.g., via an input device 210, receiving device 202, etc.) user credentials from a user 102 wanting to use a hardware device 104. The user credentials may be supplied using any suitable method and may include at least a user identifier. In some instances, the user credentials may also include authentication data, such as to prove that the user 102 is genuine. In step 304, the device controller 106 may detect (e.g., via a detection module 216) usage of the hardware device 104 in the form of usage parameters, where the detected parameters may be based on the type of device, agreement between the user 102 and a site operator, or other suitable criteria.

In step 306, the device controller 106 may calculate (e.g., via a calculation module 222) a usage fee for usage of the hardware device 104 by the user 102. The usage fee may be calculated based on the detected usage parameters and a rate schedule for the hardware device 104 (e.g., stored in a memory 226 of the device controller 106 or otherwise received thereby). In step 308, the device controller 106 may submit (e.g., via a transmitting device 224) a usage transaction to a node in the data storage system 108 using a suitable communication network and method. The usage transaction may include at least a user identifier or other data, such as identified from the received user credentials, and the calculate usage fee.

In step 310, the data storage system 108 may receive (e.g., via a receiving device 202) the usage transaction from the device controller 106. In step 312, the data storage system 108 may perform a confirmation process to confirm the new usage transaction and/or any past usage transactions depending on the type of transparent data storage utilized. For instance, if a Tangle is used, past usage transactions may be approved to have the new usage transaction added to the Tangle. If a blockchain is used, step 312 may include the generation of a new block that includes the new usage transaction and confirmation thereof by other nodes in the data storage system 108. In step 314, the new usage transaction may be added into the transparent data storage through a suitable method depending on the implementation.

In step 316, the aggregator node 110 may receive (e.g., via a receiving device 202) the confirmed usage transactions from the data storage system 108. In step 318, the aggregator node 110 may aggregate (e.g., via a calculation module 222) the usage fees for a plurality of users 102 from usage transactions that include the user's respective user data. In step 320, the aggregator node 110 may generate (e.g., via a generation module 220) a bill for each of the users 102 for the aggregated usage fee amount. In step 322, the aggregator node 110 may distribute (e.g., via a transmitting device 224) the bill for each of the users 102 to the respective user 102 via a computing device associated therewith (e.g., identified in a user profile 208 in a user database 206 of the aggregator node 110 using the user data).

Exemplary Method for Billing Device Usage

Figure 4:
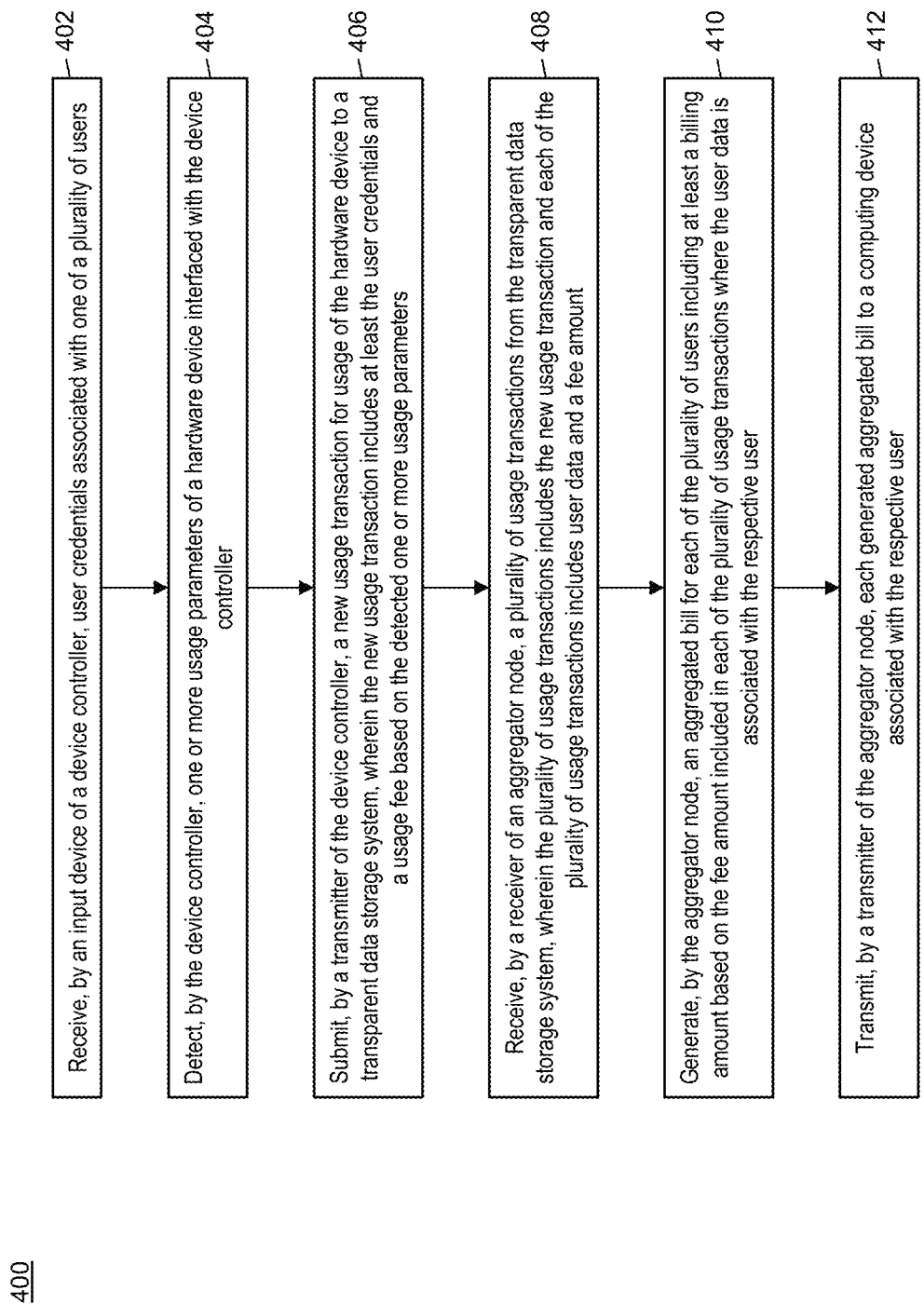
FIG. 4 is a flow chart illustrating an exemplary method for billing device usage through a transparent data storage system and aggregation in accordance with exemplary embodiments.

FIG. 4 illustrates a method 400 for billing for the usage of hardware devices by a plurality of users through the use of a transparent data storage system and aggregation of usage transactions.

In step 402, user credentials associated with one of a plurality of users (e.g., users 102) may be received by an input device (e.g., input device 210) of a device controller (e.g., device controller 106). In step 404, one or more usage parameters of a hardware device (e.g., hardware device 104) interfaced with the device controller may be detected by the device controller (e.g., via a detection module 216). In step 406, a new usage transaction for usage of the hardware device may be submitted by a transmitter (e.g., transmitting device 224) of the device controller to a transparent data storage system (e.g., data storage system 108), wherein the new usage transaction includes at least the user credentials and a usage fee based on the detected one or more usage parameters.

In step 408, a plurality of usage transactions may be received by a receiver (e.g., receiving device 202) of an aggregator node (e.g., aggregator node 110) from the transparent data storage system, wherein the plurality of usage transactions includes the new usage transaction and each of the plurality of usage transactions includes user data and a fee amount. In step 410, an aggregated bill may be generated by the aggregator node (e.g., via a generation module 220) for each of the plurality of users including at least a billing amount based on the fee amount included in each of the plurality of usage transactions where the user data is associated with the respective user. In step 412, each aggregated bill may be transmitted by a transmitter (e.g., transmitting device 224) of the aggregator node to a computing device associated with the respective user.

In one embodiment, the method 400 may further include storing, in a user database (e.g., user database 206) of the aggregator node, a plurality of user profiles (e.g., user profiles 208), wherein each user profile is associated with one of the plurality of users and includes at least communication data, wherein the generated aggregated bill is transmitted to a computing device based on the communication data included in the user profile associated with the respective user. In a further embodiment, a specific user profile associated with the one of the plurality of users may further include the received user credentials.

In some embodiments, the method 400 may also include: storing, in a memory (e.g., memory 226) of the device controller, a rate schedule for the hardware device; and calculating, by the device controller, the usage fee based on application of the rate scheduled to the detected one or more usage parameters. In one embodiment, the transparent data storage system may be a Tangle. In some embodiments, the transparent data storage system may be a blockchain.

In one embodiment, the transparent data storage system may be comprised of a plurality of node devices, and the device controller may be one of the plurality of node devices. In some embodiments, the hardware device may be an internet of things device.

Computer System Architecture

Figure 5:
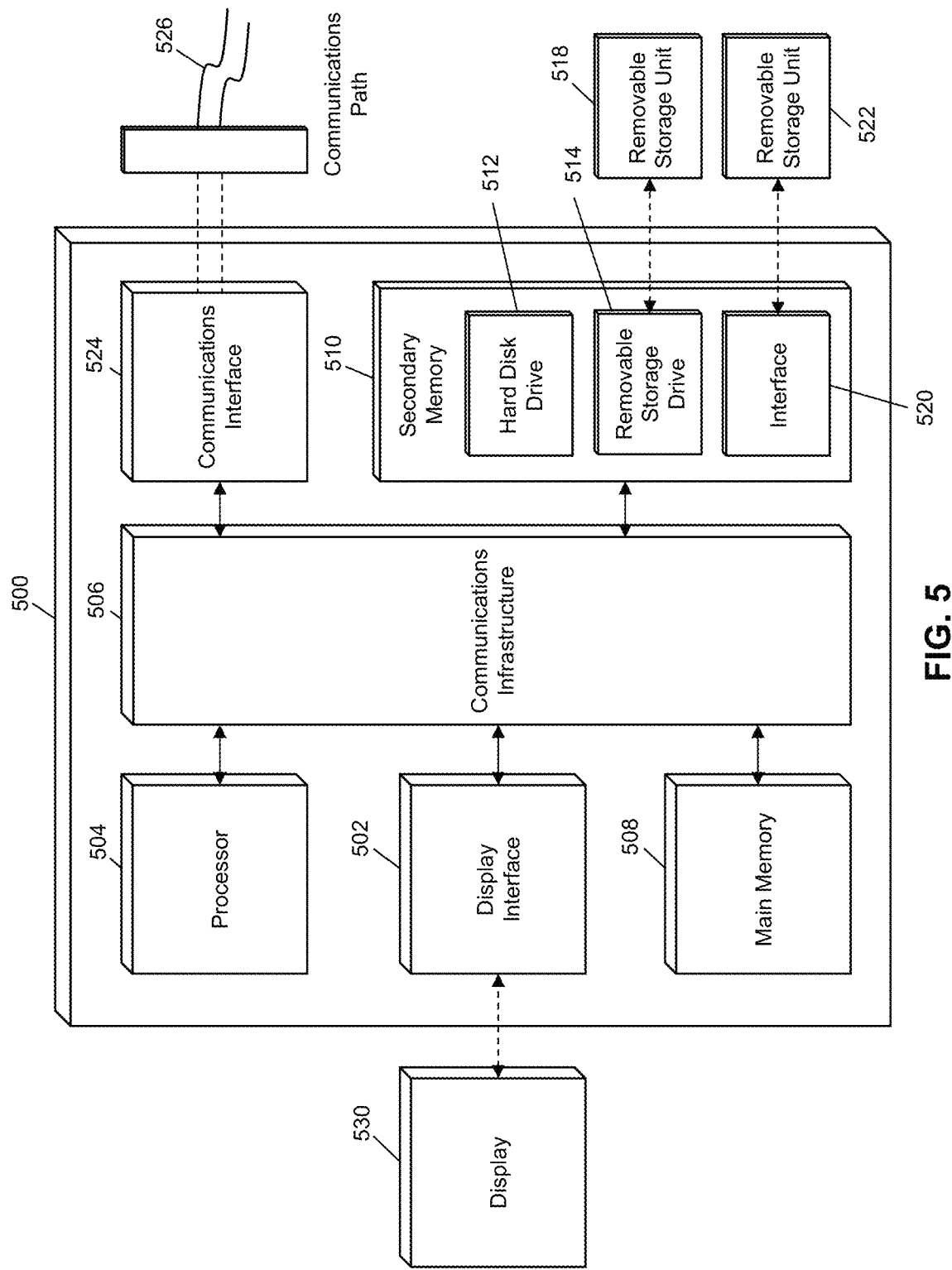
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the device controller 106 or aggregator node 110 of FIG. 1 or computing system 200 of FIG. 2 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for billing device usage through a transparent data storage system and aggregation. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for billing hardware device usage in a network system including a hardware device, a device controller, a transparent data storage system, and an aggregator node, the method comprising:
   receiving, by an input device of the device controller of the network system, user credentials associated with a user of a plurality of users, wherein the device controller is a first computing system that is interfaced with the hardware device and is in electronic communication with both the transparent data storage system and the aggregator node;
   in response to receiving the user credentials, providing, by the device controller of the network system, access to the hardware device that is interfaced with the device controller;
   detecting, by the device controller of the network system, one or more usage parameters for the user's use of the hardware device interfaced with the device controller;
   calculating, by the device controller of the network system, a usage fee for usage of the hardware device on a basis of the detected one or more usage parameters and a rate schedule for the hardware device;
   submitting, by a transmitter of the device controller, to the transparent data storage system of the network system, a new usage transaction that includes at least the user credentials and the calculated usage fee, said new user transaction being associated with usage of the hardware device;
   receiving, by a receiver of the aggregator node of the network system, from the transparent data storage system, a plurality of usage transactions including the new usage transaction, each of the plurality of usage transactions including user data and a fee amount, wherein said aggregator node is a second computing system that is in electronic communication with both the transparent data storage system and the device controller;
   generating, by the aggregator node of the network system, an aggregated bill for each of the plurality of users including at least a billing amount based on the fee amount included in each of the plurality of usage transactions received from the transparent data storage system, where the user data is associated with the respective user; and
   transmitting, by a transmitter of the aggregator node, each generated aggregated bill to a computing device associated with the respective user.

2. The method of claim 1, further comprising:
   storing, in a user database of the aggregator node, a plurality of user profiles, wherein each user profile is associated with one of the plurality of users and includes at least communication data, wherein
   the generated aggregated bill is transmitted to the computing device associated with the respective user based on the communication data included in the user profile associated with the respective user.

3. The method of claim 2, wherein a specific user profile associated with the user of the plurality of users further includes the received user credentials.

4. The method of claim 1, further comprising:
   storing, in a memory of the device controller, the rate schedule for the hardware device.

5. The method of claim 1, wherein the transparent data storage system is a Tangle.

6. The method of claim 1, wherein the transparent data storage system is a blockchain.

7. The method of claim 1, wherein the hardware device is an internet of things device.

8. A network system for billing hardware device usage, the network system comprising:
   a hardware device;
   an aggregator node;
   a transparent data storage system; and
   a device controller interfaced with the hardware device, wherein said device controller is a first computing system that is interfaced with the hardware device and is in electronic communication with both the transparent data storage system and the aggregator node,
   wherein the aggregator node is a second computing system that is in electronic communication with both the transparent data storage system and the device controller,
   wherein
   the device controller of the network system is configured to
      receive, via an input device of the device controller, user credentials associated with a user of a plurality of users;
      provide access to the hardware device that is interfaced therewith in response to the input device receiving the user credentials;
      detect one or more usage parameters of a hardware device interfaced with the device controller;
      calculate a usage fee for usage of the hardware device on a basis of the detected one or more usage parameters and a rate schedule for the hardware device;
      submit, via a transmitter of the device controller, to the transparent data storage system of the network system a new usage transaction that includes at least the user credentials and the calculated usage fee, said new user transaction being associated with usage of the hardware device, and wherein the aggregator node of the network system is further configured to receive, via a receiver of the aggregator node, from the transparent data storage system, a plurality of usage transactions including the new usage transaction, each of the plurality of usage transactions including user data and a fee amount;

generate an aggregated bill for each of the plurality of users including at least a billing amount based on the fee amount included in each of the plurality of usage transactions received from the transparent data storage system, where the user data is associated with the respective user; and transmit each generated aggregated bill to a computing device associated with the respective user.

9. The system of claim 8, further comprising:
a user database of the aggregator node configured to store a plurality of user profiles, wherein each user profile is associated with one of the plurality of users and includes at least communication data, wherein the generated aggregated bill is transmitted to a computing device associated with the respective user based on the communication data included in the user profile associated with the respective user.

10. The system of claim 9, wherein a specific user profile associated with the user of the plurality of users further includes the received user credentials.

11. The system of claim 8, further comprising:
a memory of the device controller configured to store the rate schedule for the hardware device.

12. The system of claim 8, wherein the transparent data storage system is a Tangle.

13. The system of claim 8, wherein the transparent data storage system is a blockchain.

14. The system of claim 8, wherein the hardware device is an internet of things device.

* * * * *